US007959160B2

(12) United States Patent
Murata et al.

(10) Patent No.: US 7,959,160 B2
(45) Date of Patent: Jun. 14, 2011

(54) METAL GASKET

(75) Inventors: Takeshi Murata, Tokyo (JP); Manabu Yasuda, Tokyo (JP); Satoshi Tanaka, Tokyo (JP)

(73) Assignee: Nichias Corporation, Tokyo (JP)

( * ) Notice: Subject to any disclaimer, the term of this patent is extended or adjusted under 35 U.S.C. 154(b) by 349 days.

(21) Appl. No.: 12/057,589

(22) Filed: Mar. 28, 2008

(65) Prior Publication Data

US 2008/0237997 A1 Oct. 2, 2008

(30) Foreign Application Priority Data

Mar. 29, 2007 (JP) ................................ 2007-088524

(51) Int. Cl.
*F02F 11/00* (2006.01)
*F16J 15/08* (2006.01)

(52) U.S. Cl. ......................... 277/592; 277/598; 277/654

(58) Field of Classification Search .......... 277/592–593, 277/598, 652, 654
See application file for complete search history.

(56) References Cited

U.S. PATENT DOCUMENTS

| | | | | |
|---|---|---|---|---|
| 5,516,120 A * | 5/1996 | Damusis | ....................... | 277/591 |
| 6,076,833 A * | 6/2000 | Geshi | ........................... | 277/595 |
| 6,131,915 A * | 10/2000 | Nicholson | ...................... | 277/593 |
| 6,702,297 B2 * | 3/2004 | Furuta et al. | .................. | 277/592 |
| 7,726,662 B2 * | 6/2010 | Foster | .......................... | 277/592 |
| 2006/0197288 A1 * | 9/2006 | Sakamoto | ..................... | 277/592 |

FOREIGN PATENT DOCUMENTS

| | | |
|---|---|---|
| JP | 11-37296 A | 2/1999 |
| JP | 2003-287135 | 10/2003 |
| JP | 2005-180552 A | 7/2005 |
| JP | 2005-315416 A | 11/2005 |
| JP | 2006-242294 A | 9/2006 |

OTHER PUBLICATIONS

Notification of Reasons for Refusal Mailed Feb. 1, 2011 in Japanese Application No. 2007-088524, with English translation (4 pages).

* cited by examiner

*Primary Examiner* — Vishal Patel
(74) *Attorney, Agent, or Firm* — Nixon & Vanderhye P.C.

(57) ABSTRACT

The present invention provides a metal gasket to be fitted between a cylinder head and a cylinder block to seal a gap between the surfaces thereof, which comprises: a thin metal plate with an opening formed at a position corresponding to a bore portion of the cylinder block, the opening having a diameter larger than that of the bore portion; and a pair of elastic metal substrates each having: an opening which substantially agrees with the bore portion of the cylinder block; an annular convex portion formed concentrically with the opening at a position apart from an edge portion of the opening by a specified distance; and an annular holding portion for holding a peripheral portion of the opening of the thin metal plate, horizontally extending out from an outer edge portion of the convex portion, wherein the pair of the elastic metal substrates are disposed so that top portions of the respective convex portions face each other and that the holding portions overlap with the thin metal plate, and engaged to the thin metal plate at a plurality of positions.

5 Claims, 5 Drawing Sheets

A1
30
31a
40
32
21
31
A
32
30
31a
40
A2

METAL GASKET

FIELD OF THE INVENTION

The present invention relates to an improvement of a metal gasket to be fitted between a cylinder block and a cylinder head of an internal combustion engine.

BACKGROUND OF THE INVENTION

In an internal combustion engine, a metal gasket is interposed between joint surfaces of a cylinder block and a cylinder head, followed by fastening, thereby imparting a sealing function. In particular, sealing in a region surrounding a bore portion of the cylinder block is important, and insufficient sealing in this portion causes a pressure drop in a combustion chamber and overheat. Consequently, a metal gasket which is constituted such that a thin metal plate having an opening corresponding to the bore portion is held between a pair of elastic metal substrates provided with beads concentric with the bore portion to enhance the sealing function of a peripheral portion surrounding the bore portion by utilizing repulsive force of the bead generated when the whole is fastened, has been in heavy usage (for example, see patent document 1).

FIG. 8 is a partially cutaway top view showing a metal gasket described in patent document 1, and FIG. 9 is a cross sectional view taken on the line X-X of FIG. 8. As shown therein, the metal gasket is constituted by disposing a thin metal plate B having openings 1 formed corresponding to bore portions of a cylinder block and having a plane shape in which substantially three rings are connected, and a pair of elastic metal substrates A1 and A2 having openings 1 provided corresponding to the openings 1 of the thin metal plate B and annular convex beads 2 formed on peripheral portions of the openings 1, so as to hold peripheral portions of the openings 1 of the thin metal plate B between the beads 2 of the elastic metal substrates A1 and A2. Further, the elastic metal substrates A1 and A2 of the metal gasket are also provided with similar beads 3 on peripheral portions of openings 8 for piping. The reference numeral 6 in the drawings designates a locking claw for locking the thin metal plate B to the elastic metal substrates A1 and A2.

Patent Document 1: JP-A-2003-287135

SUMMARY OF THE INVENTION

In the metal gasket having the above-mentioned constitution in which the thin metal plate B is held between the elastic metal substrates A1 and A2, sealing performance depends on a holding force for holding the thin metal plate B between the respective beads 2 of the elastic metal substrates A1 and A2. However, the force for fastening the metal gasket is transferred to the beads 2 through planar portions 4 of the elastic metal substrates A1 and A2, so that higher fastening force is required for enhancing the holding force through the beads 2. Usually, a considerably excessive fastening force is applied so that the elastic metal substrates A1 and A2 are brought into abutting contact with each other. Consequently, an excessive pressing force is applied to a joint surface of the cylinder block with respect to the cylinder head to thereby bring about deformation of the bore portions in some cases, and there is the possibility of causing deterioration of fuel consumption or the like.

Further, stainless steel-based elastic metal plates excellent in spring characteristics are used as the elastic metal substrates A1 and A2 in many cases. Moreover, the elastic metal substrates A1 and A2 needs to have an area that covers the entire surface of the joint surface of the cylinder block with respect to the cylinder head, and further, upper and lower, two sheets of plates are necessary. For these reasons, this technique involves a problem of an increased material cost.

Furthermore, the structure in which the thin metal plate 3 is held between the beads 2 is employed, so that the surface pressure on the periphery of the bore opening is influenced by the thickness of this thin metal plate B. When the surface pressure on the periphery of the bore portion is high, the surface pressure applied to the periphery of the bore opening increases to change the clearance between the cylinder block and a piston. This change causes friction between the cylinder head and the piston, and results in deterioration of fuel consumption as well. Accordingly, as the surface pressure on the periphery of the bore opening, there is the optimum surface pressure at which the clearance between the cylinder block and the piston does not change, and the thickness of the thin metal plate B must be determined so as to give the optimum surface pressure. However, the optimum surface pressure varies by a difference of several micrometers to several tens of micrometers with respect to the thin metal plate B, so that the adjustment of the surface pressure becomes very fine adjustment. However, commercially available thin metal plates are poor in selectivity by thickness, and the unit of the thickness is from 0.05 to 0.1 mm. It is therefore impossible to perform fine adjustment of the surface pressure.

The invention has been made in view of the above-mentioned problems, and an object of the invention is to provide a metal gasket which gives sufficient sealing performance in spite of low fastening force, does not bring about deformation of a bore portion of a cylinder block, and can be produced at low cost.

In order to achieve the above-mentioned object, the invention provides metal gaskets shown below:

(1) A metal gasket to be fitted between a cylinder head and a cylinder block to seal a gap between the surfaces thereof, which comprises:

a thin metal plate with an opening formed at a position corresponding to a bore portion of the cylinder block, the opening having a diameter larger than that of the bore portion; and a pair of elastic metal substrates each having:

an opening which substantially agrees with the bore portion of the cylinder block;

an annular convex portion formed concentrically with the opening at a position apart from an edge portion of the opening by a specified distance; and an annular holding portion for holding a peripheral portion of the opening of the thin metal plate, horizontally extending out from an outer edge portion of the convex portion, wherein the pair of the elastic metal substrates are disposed so that top portions of the respective convex portions face each other and that the holding portions overlap with the thin metal plate, and engaged to the thin metal plate at a plurality of positions;

(2) A metal gasket to be fitted between a cylinder head and a cylinder block to seal a gap between the surfaces thereof, which comprises:

a thin metal plate with an opening formed at a position corresponding to a bore portion of the cylinder block, the opening having a diameter larger than that of the bore portion; and a pair of elastic metal substrates each having:

an opening which substantially agrees with the bore portion of the cylinder block;

an annular convex portion formed concentrically with the opening at a position apart from an edge portion of the opening by a specified distance;

a planar portion horizontally extending out from an outer edge portion of the convex portion;

an inclined portion inclined from an outer edge portion of the planar portion so as to gradually depart from the convex portion; and an annular holding portion for holding a peripheral portion of the opening of the thin metal plate, horizontally extending out from an outer edge portion of the inclined portion, wherein the pair of the elastic metal substrates are disposed so that top portions of the respective convex portions face the opposite directions and that the holding portions overlap with the thin metal plate, and engaged to the thin metal plate at a plurality of positions; and (3) The metal gasket described in the above (1) or (2), wherein a coating layer comprising a foamed rubber is formed on at least one of the opening peripheral portion of the thin metal plate and a surface of the holding portion of the elastic metal substrate that contact with the thin metal plate.

In the metal gasket of the invention, a sealed portion at which annular convex portions formed on a pair of elastic metal substrates face each other, or at which outer edge portions of the convex portions face each other in the case where top portions of the convex portions face the opposite directions, and a sealed portion formed by bringing holding portions formed on the elastic metal substrates and a thin metal plate into abutting contact with each other, are formed. Therefore, the invention provides high sealing performance, decreased fastening force and no occurrence of deformation of a bore portion of a cylinder block. Further, a pair of the elastic metal substrates are required to be formed only on the periphery of the bore portion, so that the material cost can be decreased.

Further, a conventional metal gasket has produced the surface pressure on the periphery of the bore opening by holding a thin metal plate between a pair of elastic metal substrates, so that the surface pressure becomes too high depending on the thickness of the thin metal plate, which has caused the occurrence of friction between a cylinder block and a spindle. However, the metal gasket of the invention can have a structure in which the thin metal plate (the reference sign B in FIG. 8) held by a pair of the elastic metal substrates is not used, and can decrease the surface pressure on the periphery of the bore opening. Accordingly, the friction can be inhibited.

Figure 1:
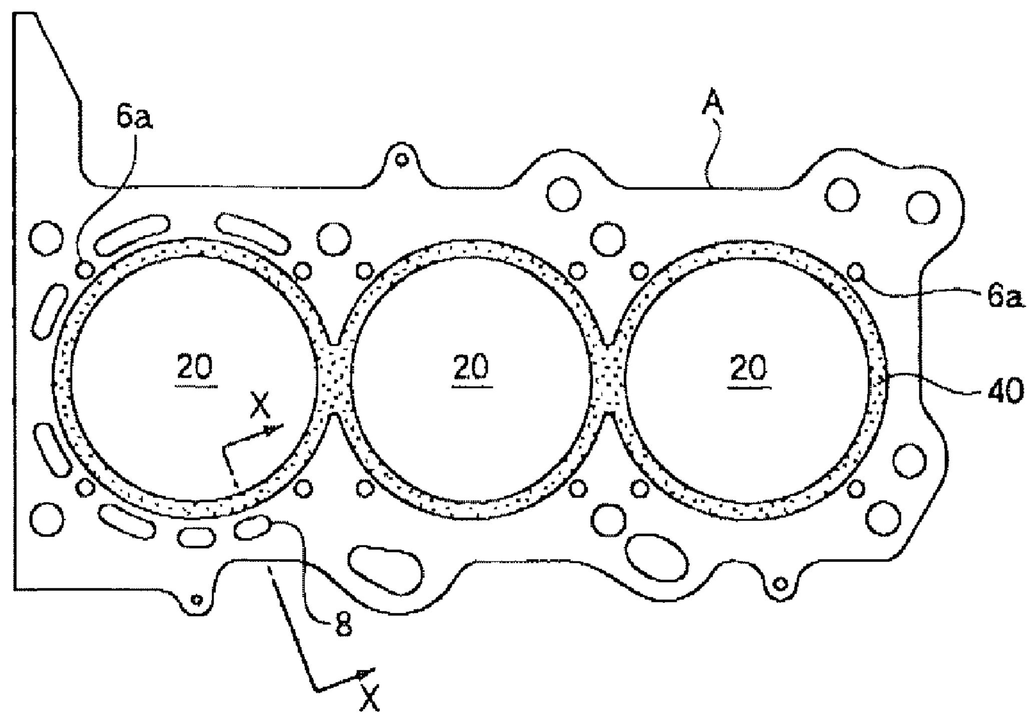
FIG. 1 is a top view showing one embodiment of a thin metal plate constituting a metal gasket of the invention.

The reference numerals and signs used in the drawings denote the following, respectively.

A1, A2: Elastic Metal Substrates
A: Thin Metal Plate
10: Cylinder Block
11: Cylinder Head
20, 21: Openings
30: Opening Edge
31: Convex Portion
32; Holding Portion
33: Planar Portion
34: Inclined Portion
40: Foamed Rubber Layer

DETAILED DESCRIPTION OF THE INVENTION

The invention will be described in detail below.

The metal gasket of the invention has a constitution in which a thin metal plate is held between a pair of elastic metal substrates.

Figure 2:
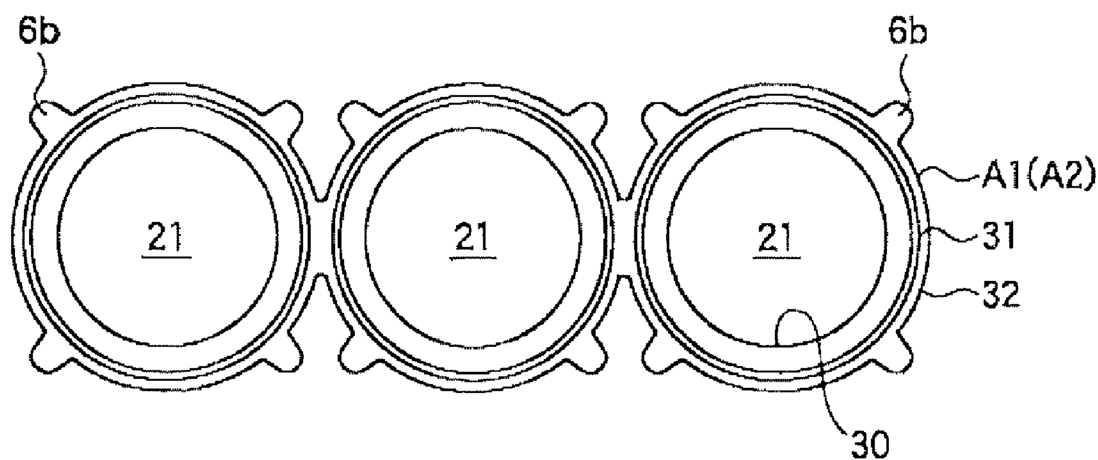
FIG. 2 is a top view showing one embodiment of an elastic metal substrate constituting a metal gasket of the invention.
Figure 8:
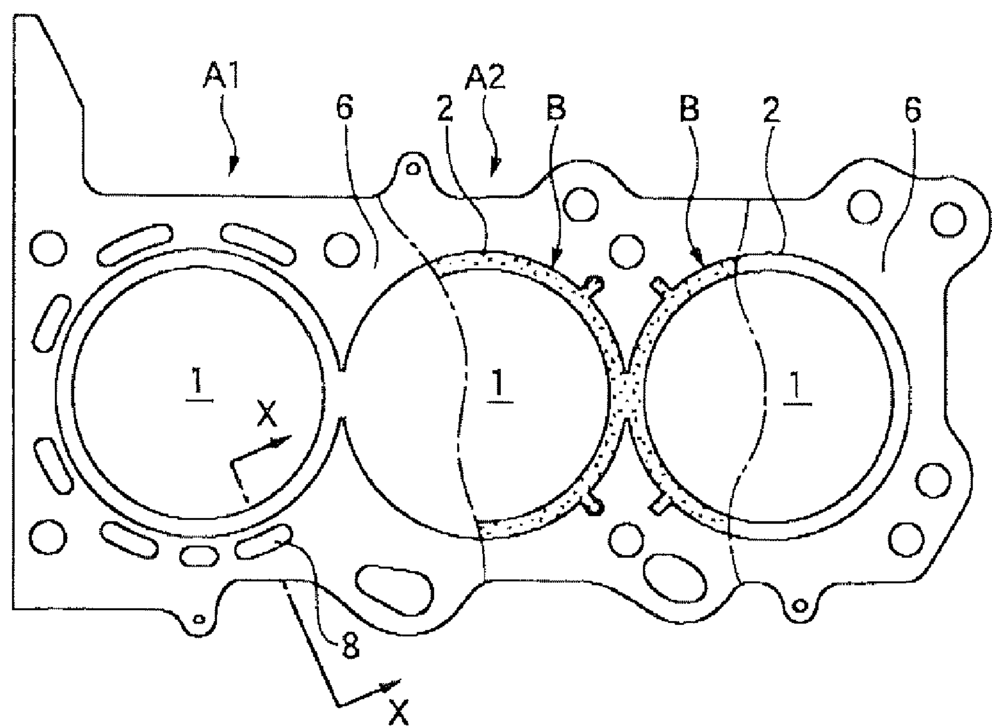
FIG. 8 is a top view showing a conventional metal gasket.
Figure 9:
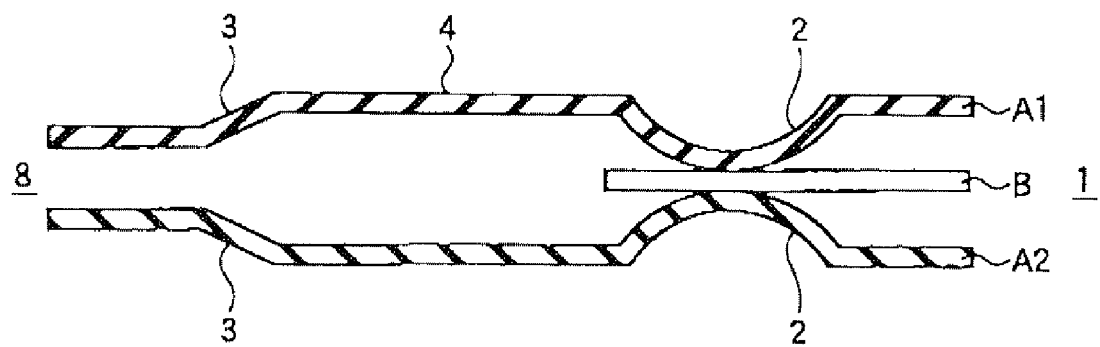
FIG. 9 is a cross sectional view taken along line X-X of FIG. 7.

FIG. 1 is a top view showing a metal gasket, and FIG. 2 is a top view showing elastic metal substrates A1 and A2. Further, FIG. 8 is a cross sectional view showing the whole metal gasket, taken along line X-X of FIG. 1.

The thin metal plate A has openings 20 having a diameter larger than that of bore portions of a cylinder block, and the other part has a shape corresponding to a joint surface of the cylinder block to the cylinder head. FIG. 1 is shown corresponding to FIG. 7, and openings 8 for piping and locking portions 6*a* for locking the elastic metal substrates A1 and A2 are formed.

Further, foamed rubber layers 40 and 40 may be formed on the thin metal plate at least at contact portions with the elastic metal substrates A1 and A2. The foamed rubber layer 40 can be formed, for example, by applying a rubber compound in which a vulcanizing agent, a vulcanization accelerator and a heat decomposable foaming agent are incorporated in NBR, HNBR, fluororubber, EPDM, acrylic rubber or the like, followed by heating at a foaming temperature of the foaming agent. The formation of the foamed rubber layer 40 enhances sealing performance of a portion held between the elastic metal substrates A1 and A2.

On the other hand, the elastic metal substrates A1 and A2 have openings 21 having a diameter substantially equivalent to that of the bore portions, and an annular and cross-sectionally semicircular convex portion 31 is formed at a position apart from an opening edge portion 30 by a specified distance. Further, a tabular holding portion 32 continuously extending out from an edge portion (hereinafter referred to as an outer edge portion) on the side apart from the opening edge portion 30 of the convex portion 31 is formed. Furthermore, in a top-view shape, three rings are connected corresponding to the openings 20 of the thin metal plate A, and locking portions 6*b* corresponding to the locking portions 6*a* of the thin metal plate A are formed at appropriate positions of the holding portion 32.

Although not shown in the drawing, a foamed rubber layer similar to the above may be formed on a contact surface of the holding portion 32 with the thin metal plate A. Further, when the foamed rubber layer is formed on the holding portion 32, no foamed rubber layer may be formed on the thin metal plate A. That is to say, what is necessary is just to form the foamed rubber layer on at least one of the thin metal plate A and the elastic metal substrates A1 and A2.

Then, a pair of the elastic metal substrates A1 and A2 are disposed so that top portions 31*a* of the respective convex portions 31 face each other and that the holding portions 32 overlap with the thin metal plate A, and the locking portions 6*a* of the thin metal plate A and the locking portions 6*b* of the elastic metal substrates A1 and A2 are engaged to each other by mechanical caulking such as grommets or rivets, thereby completing the metal gasket of the invention.

Figure 4:
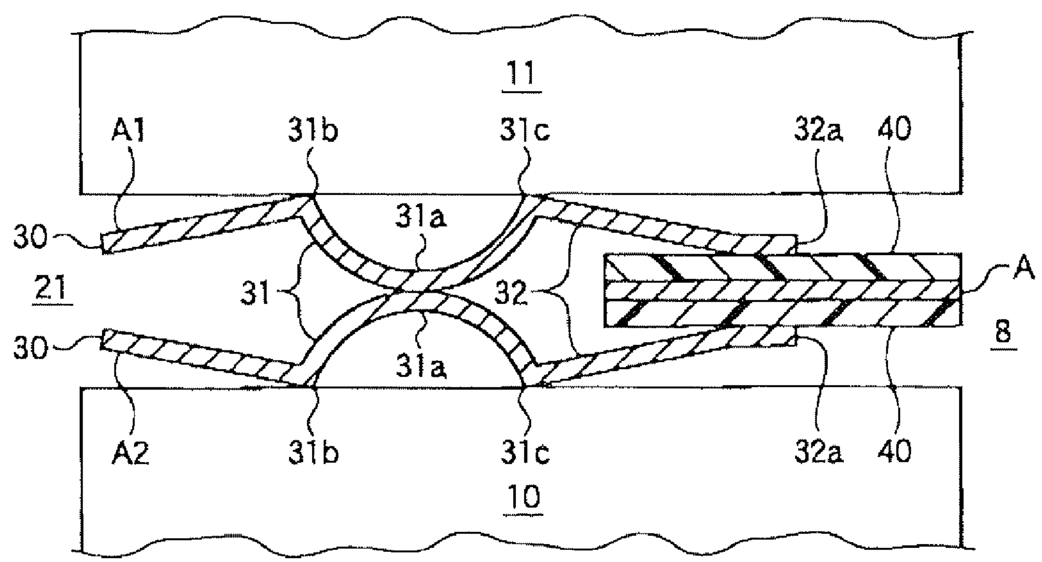
FIG. 4 is a cross sectional view showing a state in which the metal gasket shown in FIG. 3 is mounted between joint surfaces of a cylinder block and a cylinder head.

FIG. 4 is a cross sectional view showing a state in which the above-mentioned metal gasket is mounted on a joint portion of a cylinder block 10 and a cylinder head 11. As shown in FIG. 4, when the cylinder block 10 and cylinder head 11 are fastened to bring both convex portions 31 and 31 of the elastic metal substrates A1 and A2 into abutting contact with each other, fastening force is transmitted to both edges 31*b* and 31*c* of the convex portions 31. Then, further fastening allows stress to the convex portions 31 to focus on both edges 31*b* and 31*c* of the convex portions 31, and opening edge portions 30 and edge portions 32*a* of the holding portions 32 each bend inwardly (to the thin metal plate side) by reaction force thereof to press the thin metal plate A in the vicinity of the edge portions 32*a* of the holding portions 32. Accordingly, in the elastic metal substrates A1 and A2, the height of the convex portion 31 and the length (the distance from the edge 31*c* of the convex portion 31 to the edge portion 32*a*) of the holding portion 32 are adjusted so that the edge portion 32*a* of the holding portion 32 is brought into abutting contact with the thin metal plate A when fastened.

As described above, according to the metal gasket of the invention, sealing can be performed by the abutting contact portion of both convex portions 31 and 31 of the elastic metal substrates A1 and A2 and the pressed portion of the holding portions 32 and the thin metal plate A to enhance sealing performance. Accordingly, it requires less fastening force than ever before, so that deformation of the bore portion of the cylinder block 10 can be inhibited.

Figure 5:
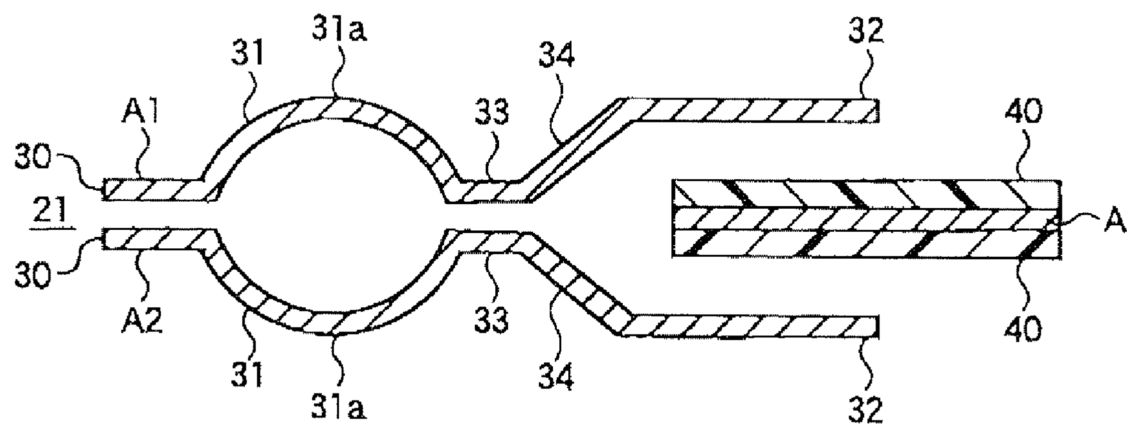
FIG. 5 is a cross sectional view showing another embodiment of a metal gasket of the invention.

Further, the thin metal plate A is left as it is, and the elastic metal substrates A1 and A2 can also be modified to a shape shown in FIG. 5 by a cross sectional view. That is to say, the elastic metal substrates A1 and A2 have openings 21 having a diameter substantially equivalent to that of the bore portions, and an annular and cross-sectionally semicircular convex portion 31 is formed at a position apart from an opening edge portion 30 by a specified distance. Further, a planar portion 33 horizontally extending out starting at an outer edge portion of the convex portion 31, an inclined portion 34 inclined starting at an outer edge portion of the planar portion 33 so as to gradually depart from a top portion 31 a of the convex portion 31, and a holding portion 32 horizontally extending out starting at an outer edge portion of the inclined portion 34 are continuously formed. Furthermore, foamed rubber layers are formed on contact surfaces of the holding portions 32 with the thin metal plate A to enhance interlayer sealing properties (in the vicinity of 32*a*).

Then, the elastic metal substrates A1 and A2 are disposed so that top portion 31*a* of the convex portions 31 of the elastic metal substrate A1 on the side of a cylinder head 11 faces the cylinder head 11, and top portion 31*a* of the convex portions 31 of the elastic metal substrate A2 on the side of a cylinder block 10 faces the cylinder block 10, and that both holding portions 32 and 32 overlap with the thin metal plate A, and locking portions 6*a* of the thin metal plate A and locking portions 6*b* of the elastic metal substrates A1 and A2 are engaged to each other by grommets rivets or the like, thereby completing the metal gasket of the invention.

Figure 6:
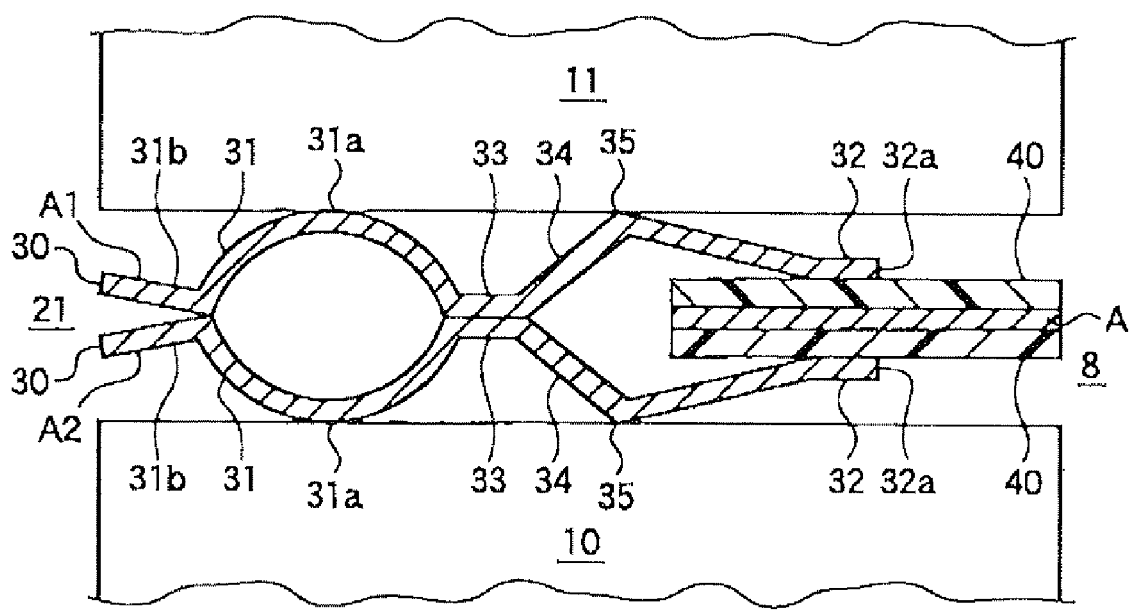
FIG. 6 is a cross sectional view showing a state in which the metal gasket shown in FIG. 5 is mounted between joint surfaces of a cylinder block and a cylinder head.

As shown in FIG. 6, when the above-mentioned metal gasket is mounted on a joint portion of a cylinder block 10 and a cylinder head 11 and fastened, top portions 31*a* of respective convex portions 31 are brought into abutting contact with the cylinder block 10 and the cylinder head 11, and both planar portions 33 and 33 of the elastic metal substrates A1 and A2 are brought into abutting contact with each other. Further, edge portions 32*a* of holding portions 32 bend inwardly (to the thin metal plate side), and elbow-shaped bends 35 formed thereby between inclined portions 34 and the holding portions 32 are brought into abutting contact with the cylinder block 10 and the cylinder head 11 to allow portions adjacent to the edge portions 32*a* to press the thin metal plate A. Like this, the top portions 31*a* of both convex portions 31 of the elastic metal substrates A1 and A2 and the elbow-shaped bends 35 between the inclined portions 34 and the holding portions 32 seal between the cylinder block 10 and the cylinder head 11, and the thin metal plate A is held between the holding portions 32, so that sealing performance is further enhanced. Accordingly, in the elastic metal substrates A1 and A2, the height of the convex portion 31 and the length of each of the planar portion 33, the inclined portion 34 and the holding portion 32 are adjusted so that the edge portion of 32*a* of the holding portion 32 is brought into abutting contact with the thin metal plate A when fastened. In addition, respective opening edge portions 30 and 30 of the elastic metal substrates A1 and A2 are each bent toward the top portions 31*a* by stress concentration to edge portions 31*b* of the convex portions 31, resulting in a deflection away from each other.

It is preferred that the holding portions 32 of the elastic metal substrates A1 and A2 and the top portions 31*a* of the convex portions 31 have the same height. However, the holding portions 32 may be positioned higher than the top portions 31*a*.

Figure 7:
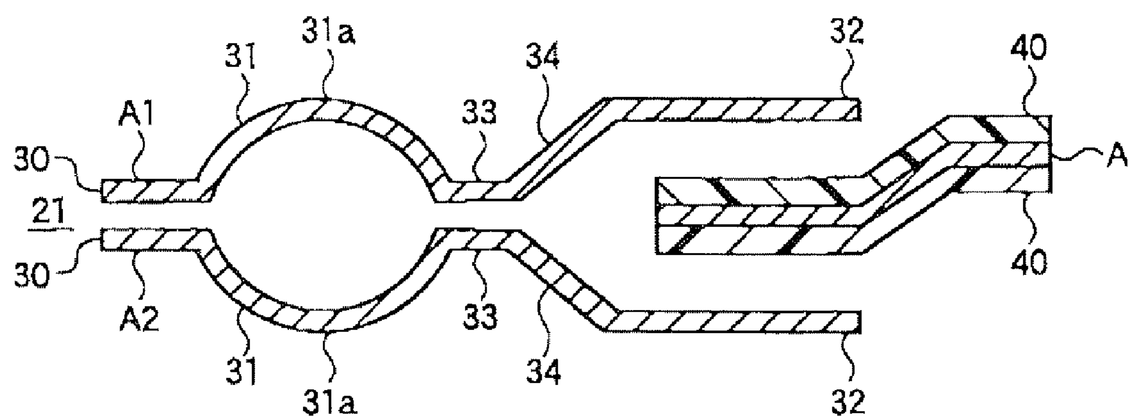
FIG. 7 is a cross sectional view showing still another embodiment of a metal gasket of the invention.

Further, a metal gasket shown in FIG. 7 can also be used. In the metal gasket shown in FIG. 7, elastic metal substrates A1 and A2 are constituted in the same manner as in the metal gasket shown in FIG. 5, and a thin metal plate A has a constitution in which beads are formed on peripheral portions of water openings or oil openings (not shown in the drawing). Then, the metal gasket comes into the fastened state shown in FIG. 6 to perform sealing.

In the above, the thin metal plate A and the elastic metal substrates A1 and A2 are preferably made of stainless steel plates (for example, the SUS 301 series), and the thickness thereof is generally from 0.1 to 0.3 mm. Further, the thin metal plate A is inelastic, so that an inelastic metal plate (for example, an SPC material) may be used, which can decrease the material cost. The foamed rubber layer 40 preferably has a thickness of 50 to 100 μm, when formed on one of the thin metal plate A and the elastic metal substrates A1 and A2, and when formed on both of the thin metal plate A and the elastic metal substrates A1 and A2, it is reduced in thickness to one half of the above.

The metal gasket of the invention performs sealing also by contact of the holding portions 32 formed in the elastic metal substrates A1 and A2 provided on the periphery of the bore opening with the thin metal plate A. Further, sealing can be performed by constituting a portion in which the thin metal plate A is brought into contact with the holding portions 32 by the foamed rubber layer, so that surface pressure on the periphery of the bore opening can be changed by changing the thickness of the foamed rubber layer. It becomes therefore possible to achieve the optimum surface pressure on the periphery of the bore opening by adjusting the thickness of the foamed rubber layer. Incidentally, the thickness of the foamed rubber layer can be adjusted by controlling the coating thickness at the time when the foamed rubber layer is formed.

In addition, the cylinder block and the cylinder head are each provided with a water jacket in a position surrounding the periphery of the bore, and cooling water is allowed to flow to each to cool the cylinder block and the cylinder head, thereby maintaining an appropriate temperature range. The cooling water which has flowed through the water jacket of the cylinder block is pumped up with a water pump to the water jacket of the cylinder head through a water opening formed in a head gasket to cool the cylinder head, and then, discharged.

The head gasket is provided between the cylinder block and the cylinder head. Accordingly, when the elastic metal substrate A1 and A2 are provided only on the periphery of the bore portion and the thin metal plate A is provided as a different member, as the metal gasket of the invention, water leakage from joint portions thereof (a portion in which the reference numerals 32*a* and 40 are brought into contact with each other in FIG. 4, and a portion in which the reference numerals 32*a* and 40 are brought into contact with each other in FIG. 6) other than the water opening makes it impossible to maintain the appropriate flow rate of water, resulting in the failure to control the head and block to maintain a constant temperature. It becomes therefore a problem to prevent water leakage. However, according to the metal gasket of the invention, the holding portions 32 formed on the elastic metal substrates A1 and A2 are brought into firm contact with the foamed rubber layers provided on the thin metal plate A by reaction force generated by pressing force applied to the beads as described above. As a result, water leakage at the above-mentioned joint portions can be prevented. The effect of preventing the water leakage is larger in the case where the foamed rubber layers and the holding portions 32 are brought into contact with each other than in the case where non-foamed rubber layers and the holding portions 32 are brought into contact with each other. This is because when the holding portion 32 is brought into contact with the foamed rubber layer, the foamed rubber layer elastically deform to increase the contact area of the holding portion 32 and the foamed rubber layer lager than the contact area at the time when the thin metal plate A other than the foamed rubber layer or the non-foamed rubber layer is brought into contact with the holding portion 32, resulting in an increase in followability.

EXAMPLES

The present invention will be illustrated in greater detail with reference to the following Examples and Comparative Examples, but the invention should not be construed as being limited thereto.

Example 1

Both surfaces of a metal substrate having a thickness of 0.25 mm were coated with a rubber compound obtained by incorporating a sulfur-based crosslinking agent and crosslinking coagent and a heat decomposable foaming agent in NBR, and dissolving the resulting mixture in toluene to form a foamed rubber layer having a thickness after drying of 150 μm, thereby preparing a thin metal plate.

Figure 3:
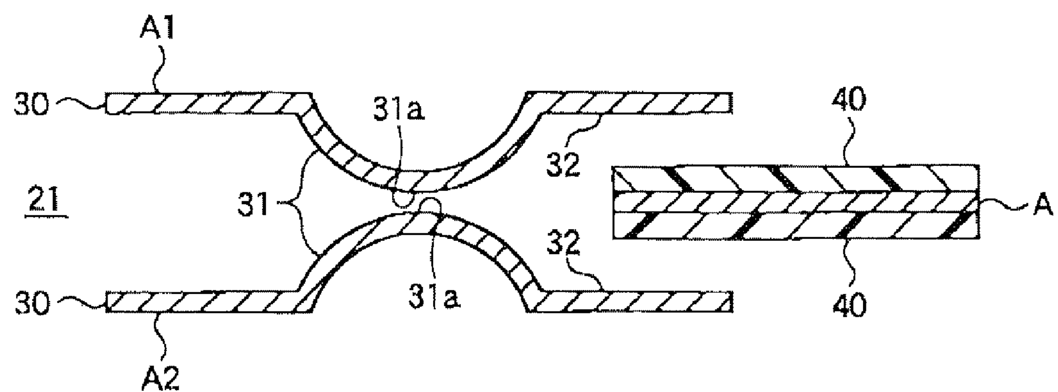
FIG. 3 is a cross sectional view showing a metal gasket of the invention constituted by laminating the thin metal plate shown in FIG. 1 and the elastic metal substrate shown in FIG. 2.

Further, using stainless steel plates having a thickness of 0.2 mm, elastic metal substrates having the cross sectional shape shown in FIG. 3 were prepared. The length from the opening edge portion 30 to the edge portion 31*b* of the convex portion 31 was taken as 1.0 mm, the convex portion 31 was smoothly rounded taking the distance between 31*b* and 31*c* as 3.0 mm and the height of the top portion 31*a* as 0.1 mm, and the length of the holding portion 32 (the distance from the edge portion 31*c* to the edge portion 32*a*) was taken as 10 mm.

Then, the thin metal plate was held between a pair of the elastic metal substrates to form a metal gasket, which was mounted between joint surfaces of an actual cylinder block and cylinder head and fastened. As a result, the elastic metal substrates were deformed approximately to the shape shown in FIG. 4. The water-oil sealing property was confirmed. As a result, it was 1 MPa to a required characteristic value of 0.6 MPa.

Example 2

Using stainless steel plates having a thickness of 011 mm, elastic metal substrates having the cross sectional shape shown in FIG. 5 were prepared. The length from the opening edge portion 30 to the edge portion 31*b* of the convex portion 31 was taken as 1.0 mm, the convex portion 31 was formed taking the distance between 31*b* and 32*c* as 1.5 mm, the height of the top portion 31*a* as 0.1 mm, the length of the planar portion 33 as 1 mm, the length of the inclined portion 34 as 1.5 mm and the length of the holding portion 32 (the distance from the edge portion 31*c* to the edge portion 32*a*) as 10 mm. Further, the convex portion 31 was the same as the holding portion 32 in height.

Then, a metal substrate having a thickness of 0.2 mm on both sides of which foamed rubber layers having a thickness after drying of 100 μm had been formed was held between a pair of the elastic metal substrates prepared to form a metal gasket, which was mounted between joint surfaces of an actual cylinder block and cylinder head. As a result, the elastic metal substrates were deformed approximately to the shape shown in FIG. 6. As for the water-oil sealing property, no leakage was confirmed at 40° C. to 120° C. for 300 cycles.

While the present invention has been described in detail and with reference to specific embodiments thereof, it will be apparent to one skilled in the art that various changes and modifications can be made therein without departing from the spirit and scope thereof.

This application is based on Japanese Patent Application No. 2007-088524 filed Mar. 29, 2007, and the contents thereof are herein incorporated by reference.

What is claimed is:

1. A metal gasket to be fitted between a cylinder head and a cylinder block to seal a gap between the surfaces thereof, which comprises:

a thin metal plate with an opening formed at a position corresponding to a bore portion of the cylinder block, the opening of the thin metal plate having a diameter larger than that of the bore portion; and a pair of elastic metal substrates each having:

an opening which substantially agrees with the bore portion of the cylinder block;

an annular convex portion formed concentrically with the opening in the elastic metal substrate at a position apart from an edge portion of the opening by a specified distance;

an annular holding portion for holding a peripheral portion of the opening of the thin metal plate, horizontally extending out from an outer edge portion of the convex portion, wherein the pair of the elastic metal substrates are disposed so that top portions of the respective convex portions face each other and that the annular holding portions overlap with the thin metal plate, and the annular holding portions comprise locking portions that are engaged to the thin metal plate at a plurality of positions;

wherein a coating layer comprising a foamed rubber is formed on at least one of the opening peripheral portion of the thin metal plate and a surface of the holding portion of the elastic metal substrate that contacts with the tin metal plate;

the thin metal plate and the elastic metal substrates having a thickness between 0.1 to 0.3 mm; and the coating layer has a thickness of 50 to 100 μm.

2. The metal gasket according to claim 1, wherein the locking portions comprise tabs.

3. The metal gasket according to claim 2, wherein the locking portions of the annular holding portions of the elastic metal substrates are engaged to corresponding locking portions of the thin metal plate.

4. The metal gasket according to claim 1, wherein the thin metal plate and the elastic metal substrates are made of the same material.

5. The metal gasket according to claim 4, wherein the material is stainless steel.

* * * * *